United States Patent [19]
Aisley

[11] Patent Number: 4,894,272
[45] Date of Patent: Jan. 16, 1990

[54] SIMULATED TILE COUNTER TOP

[75] Inventor: William J. Aisley, Malibu, Calif.

[73] Assignee: Jensen General Corp., Los Angeles, Calif.

[21] Appl. No.: 233,906

[22] Filed: Aug. 17, 1988

Related U.S. Application Data

[63] Continuation of Ser. No. 12,439, Feb. 9, 1987, abandoned.

[51] Int. Cl.$^4$ ............................................. B32B 3/00
[52] U.S. Cl. ..................................... 428/156; 428/44; 428/45; 428/119; 428/161; 428/167; 428/168; 428/192; 428/542.2; 428/542.6; 428/913.3; 52/309.1; 52/311; 52/605
[58] Field of Search .................. 428/44, 45, 46, 47, 428/48, 49, 161, 163, 167, 192, 542.2, 915.3, 119, 156, 159, 168, 174, 187, 542.6, 904.4, 913.3; 52/389, 384, 385, 320, 247, 309.1, 311, 605, 607

[56] References Cited
U.S. PATENT DOCUMENTS

| 1,642,954 | 4/1927 | Humphreys . | |
| 1,657,159 | 2/1928 | Greenebaum | 428/47 |
| 2,095,641 | 10/1937 | Knight | 72/17 |
| 4,522,855 | 6/1985 | Bethea | 428/49 |
| 4,567,704 | 2/1986 | Bernett et al. | 428/49 |
| 4,579,767 | 4/1986 | Coggan | 428/161 |
| 4,681,786 | 7/1987 | Brown | 428/49 |

Primary Examiner—Jose G. Dees
Assistant Examiner—Donald J. Loney
Attorney, Agent, or Firm—Harlan P. Huebner

[57] ABSTRACT

The manufacturing process of producing a simulated tile lavatory top and grouting in a single piece product wherein there is a matrix which is formed from liquified material which is poured into a mold with forming ribs therein and the simulated tiles and grouting are produced upon hardening of the matrix.

In addition, the invention relates to the end product of a single piece top which includes a top surface grouting paths with simulated tiles therebetween.

5 Claims, 5 Drawing Sheets

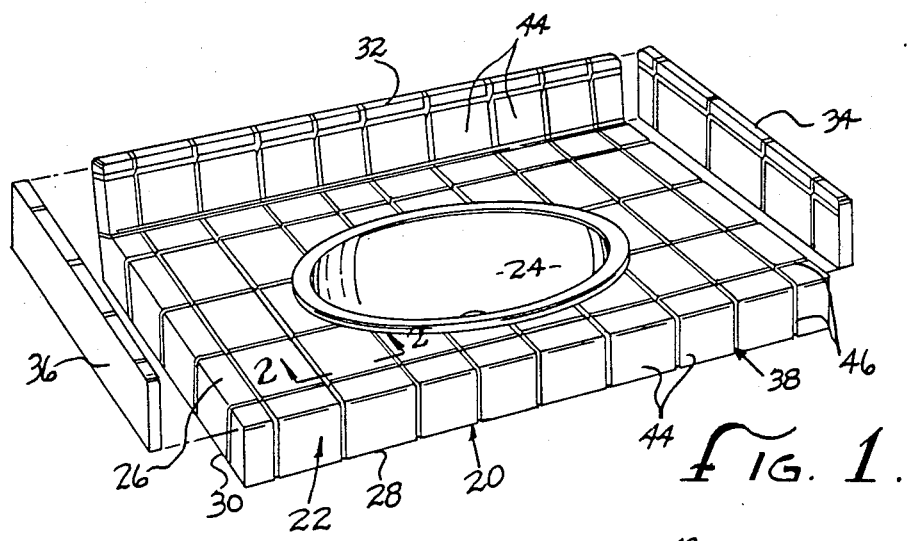
FIG. 1.
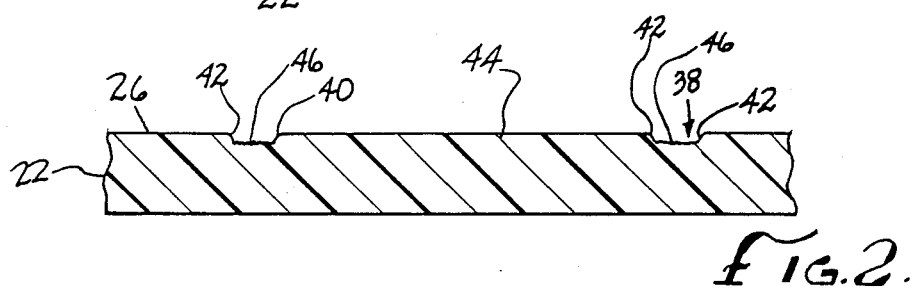
FIG. 2.
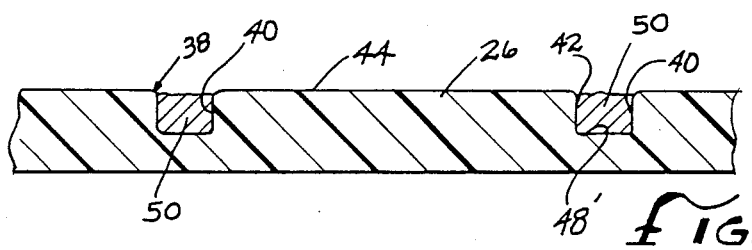
FIG. 3.
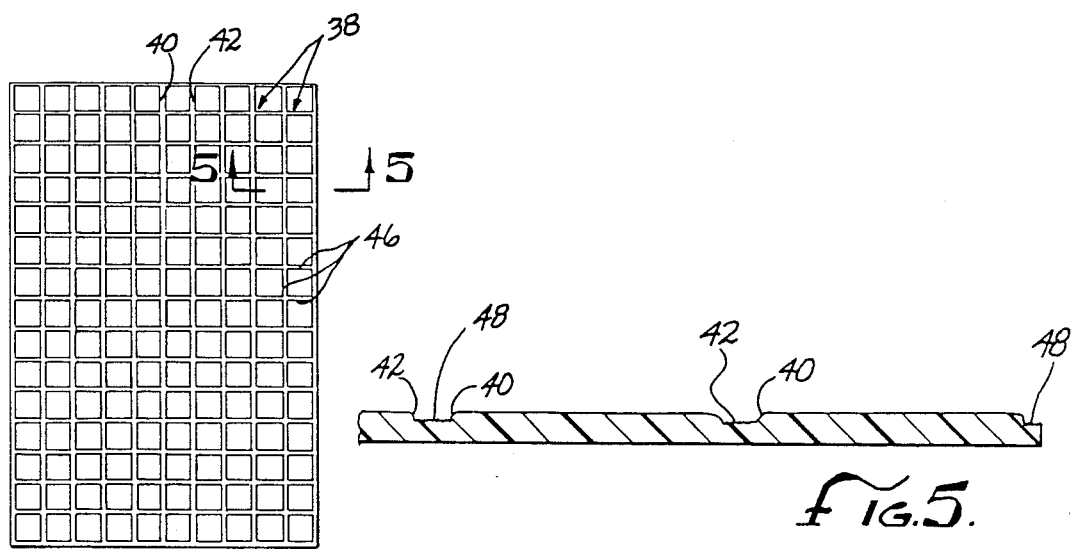
FIG. 4.
FIG. 5.

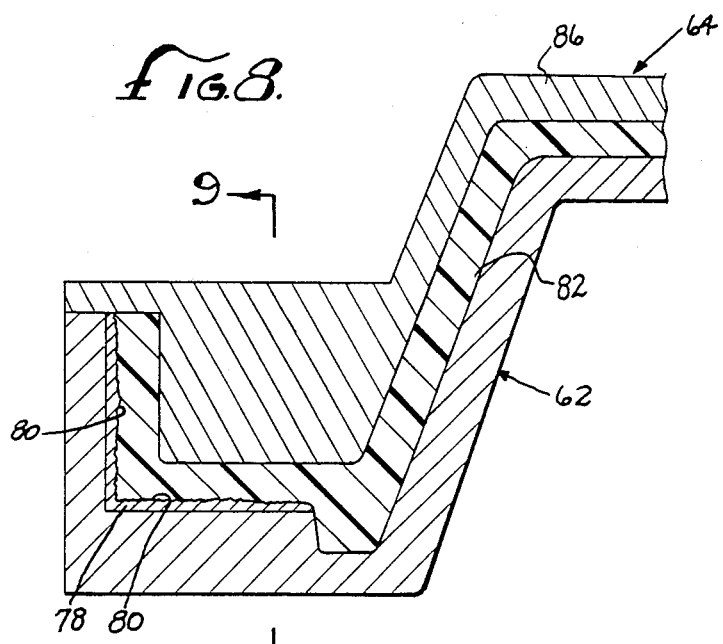
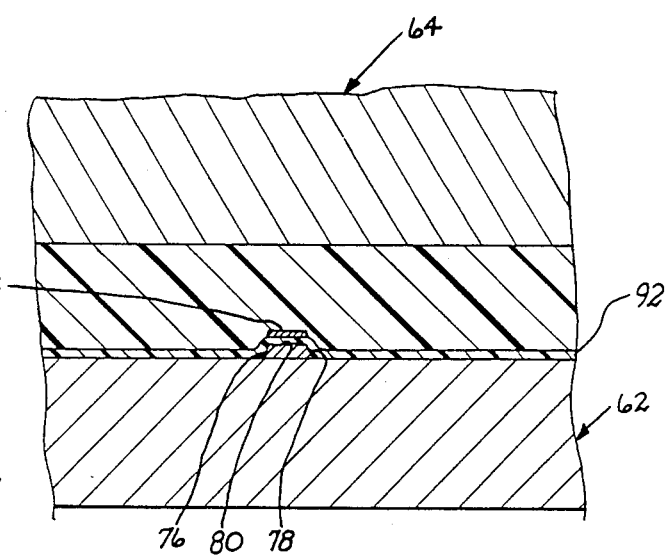
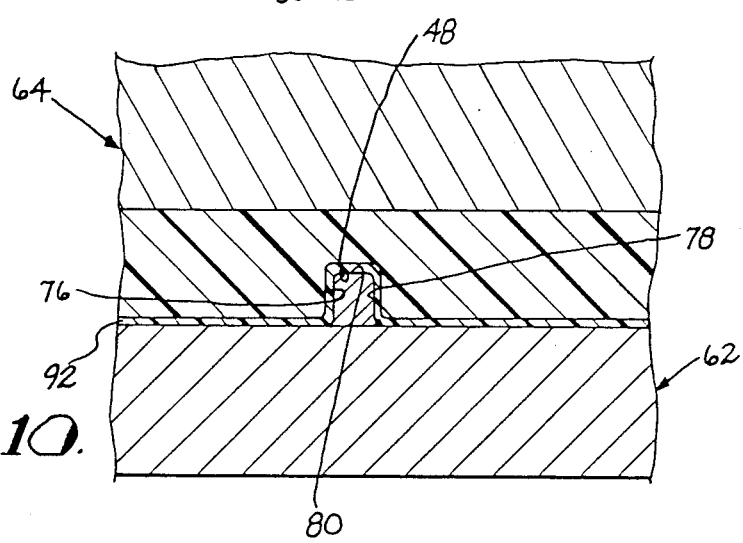

SIMULATED TILE COUNTER TOP

This is a continuation of copending application Ser. No. 12,439 filed Feb. 9, 1987 now abandoned.

BACKGROUND OF THE INVENTION

1. Field of the Invention

This invention relates to the manufacture of simulated tile lavatory tops and counter tops and the end product of such manufacture.

2. Description of the Prior Art

Marble matrices of various ingredients have been used for sometime in the manufacture of simulated marble lavatory and tops and other counter tops.

In the case of such simulated marble tops the manufacture thereof includes the mixing of a matrix and the use of an appropriate mold where the matrix in liquified form is poured therein and allowed to harden. The hardened matrix, depending on the ingredients, will visually appear colored with stratas of other colors therein to simulate real marble.

However, the inventor has no knowledge of counter tops or lavatory tops made to simulate tile and grouting having ever been commercially produced.

SUMMARY OF THE INVENTION

It is an object of the present invention to manufacture a simulated tile lavatory top, counter top, etc. wherein there is simulated grouting or appropriate recesses to receive actual grouting.

Another object of the present invention is to prepare for manufacturing molds for forming a simulated tile top wherein ribs are positioned in the mold to form simulated grouting or grooves for grouting with simulated tile pieces therebetween yet have the tile top either as a single piece or at least a piece of more than one tile in perimeter dimension.

A still further object of the present invention is to provide a manufacturing process where simulated grouting is of a different color than the simulated tile yet the total structure is one piece.

Another object of the present invention is to provide a manufacturing process wherein the ribs are of a height in a mold to create grouting grooves or paths in the simulated tile sheet where real grouting may be placed therein to further create the illusion of real tile lavatory tops, countertops, etc.

A further object of the present invention is to provide a lavatory top, counter top or other type of surface structure which is simulated tile and grouting in a single matrix at least greater in perimeter dimension than a single tile and grouting encasing some or all of the edges of a tile.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 1 is a perspective view of a single piece simulated tile and grouting lavatory top with a simulated tile splash shield rear edge as a part thereof or fixable thereto;

FIG. 2 is an enlarged cross sectional view taken on line 2—2 of FIG. 1 showing simulated tile and grouting on the top surface of a single piece of formed matrix;

FIG. 3 is a view similar to FIG. 2 but with grooves formed in the top surface with real grouting poured therein;

FIG. 4 is a representation of an enlarged area of a single sheet of simulated tile and simulated grouting thereon;

FIG. 5 is a cross-sectional view taken on line 5—5 of FIG. 4;

FIG. 8 is a cross sectional view taken on line 8—8 of FIG. 6b showing a closed mold portion with a portion of the simulated tile lavatory top therein;

FIG. 9 is a cross sectional view taken on line 9—9 of FIG. 8 showing in greater detail a portion of simulated tile and simulated grouting;

FIG. 10 is a cross sectional view similar to FIG. 9 but where the grouting groove is formed deeper so that real grouting may be used therein to further increase realism;

DETAILED DESCRIPTION OF THE PREFERRED EMBODIMENT

Figure 6A:
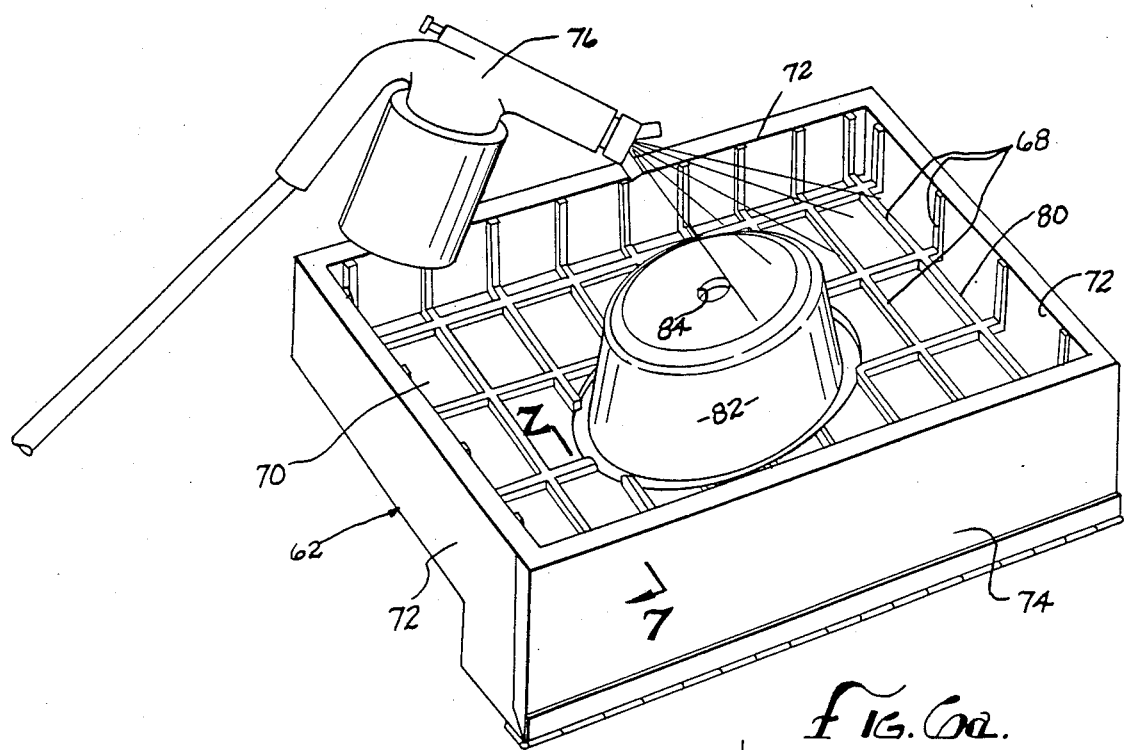
FIGS. 6a, 6b and 6c illustrate a representation of one form of mold or pieces thereof showing the steps and progression of forming a simulated tile and grouting lavatory top and sink therein.

Referring specifically to FIG. 1 there is illustrated a simulated tile and grouting lavatory top generally designated 20. The top 20 is preferably a single molded piece 22. The sink 24 may either be molded as a part of the single molded piece 22 or inserted after the piece is installed in a stand in a house or other structure.

The single piece 22 includes a top horizontal portion 26 surrounding the sink 24, a front vertical edge portion 28 and may also have a left side vertical edge portion 30 or right side depending on the configuration of the room where the installation is made. In the embodiment shown in FIG. 1 a vertical back splash section 32 extends the length of the piece 22 behind the sink 24.

Each of the portions 28, 30 and section 32 are molded with the top horizontal portion as a one piece structure.

In addition in FIG. 1 there are illustrated side vertical splash sections 34 and 36 that could be included as the back splash 32 or may be molded separately as illustrated and then affixed at the side edges of the top horizontal portion 26.

The novelty of the simulated lavatory top 20 resides in simulating tile and grouting by the use of a matrix. The matrix is conventionally formed of crushed limestone, resin, a catalyst and coloring if a single color or colors if a marble effect is desired. Generally, the matrix in its liquid form is molded by appropriate means into the desired shapes and allowed to harden. In some cases a "gelcoat" as it is known in the trade of clear resin or colored resin may be placed in the mold and then the matrix is placed on top of the gelcoat. The gelcoat helps to produce a glossy or semi-glossy outer surface.

In some instances in the present invention, the gelcoat may be colored if it is desired to form a lavatory top 20 wherein the simulated tile and simulated grouting are to be the same color.

As can be seen in FIGS. 1, 2, and 4, grouting paths or grooves generally designated 38 are formed at spaced predetermined intervals along top 20 in a front to back direction and other grooves are normal thereto in a side to side direction.

Each path or groove 38 includes a pair of spaced apart sides 40 and 42 which simulate the edges of simulated tile 44. In other words the edges 40 and 42 of the path 38 in the front to back direction form parallel side edges of the tile and edges 42 and 40 of the path 38 normal to the first path 38 form parallel edges normal to the other edges. Thus there is formed a square relief on the top horizontal portion 26 or on other portions and sections.

The simulated grouting band generally designated 38 is actually the bottom surface 48 of the path or groove 40 or 42 as in the illustrations of FIGS. 1 and 2 that extends between the side edges 40 and 42. As can been seen in FIGS. 2 and 5 the bottom surface 48 may be roughened to simulate the grains of sand or other material which in the case of real grouting may be left exposed and rough. In other instances the surface 48 may be formed smooth to represent a trowled smoothed simulated grouting band 38.

In forming the simulated grouting bands 38 the spacing may be as in FIG. 1 to represent relatively large tiles or as in FIG. 4 to represent relatively small tiles.

The construction of FIG. 3 is generally the same as previously described with the exception that the side edges 40 and 42 of the path or grooves 38 are deeper terminating in the bottom surface 48'. In this particular configuration the texture of the bottom 48' is immaterial as the grooves 38 are actually filled with real tile grouting 50 to define the simulated tiles 44 and to create a further illusion of real tile therebetween.

Figure 11:
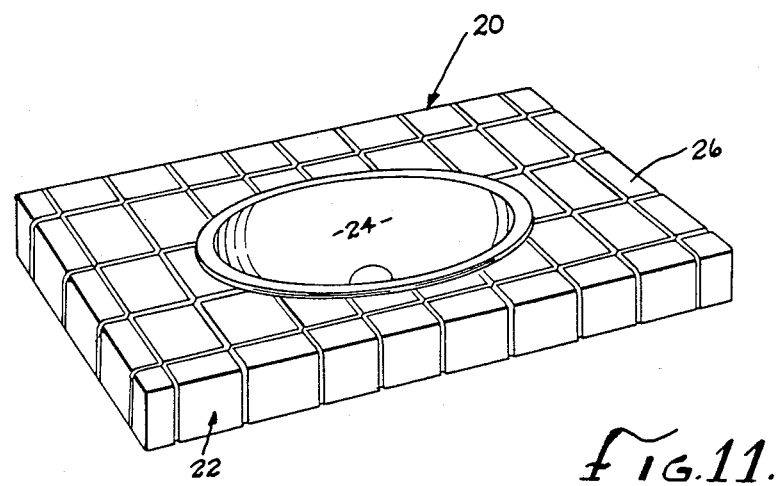
FIG. 11 is a perspective view of a lavatory top similar to FIG. 1 but without any splash shields thereon.
Figure 12:
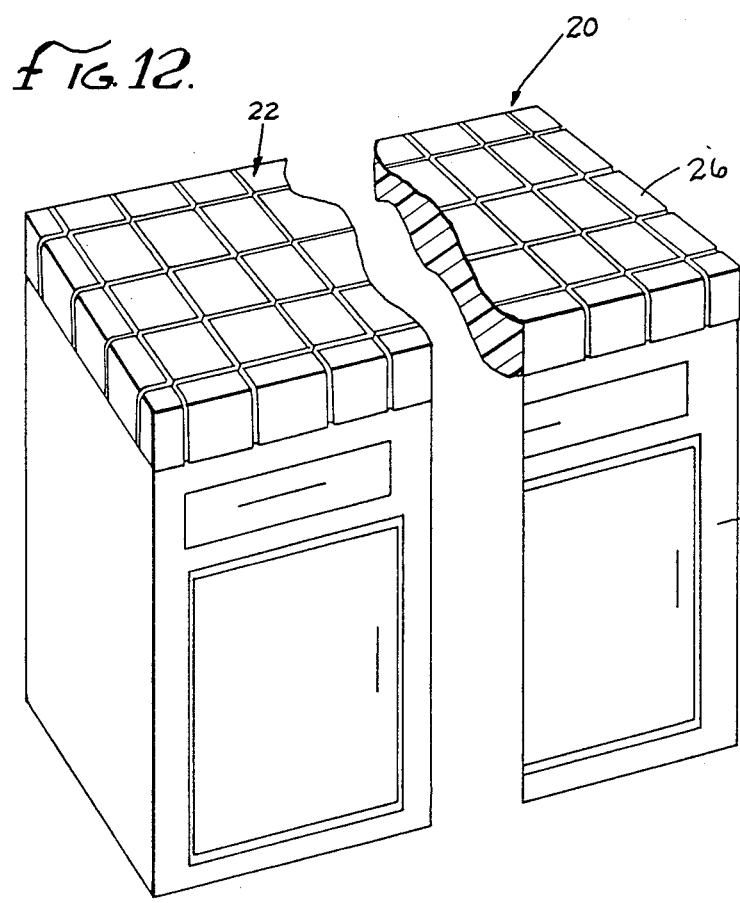
FIG. 12 is a perspective view of another use of the simulated tile and grouting single piece material manufacturing technique as a counter top such as might be used as a kitchen or bar countertop.

In FIGS. 11 and 12 further shapes of simulated tile lavatory or countertops 20 are illustrated as well as uses. The use of the simulated tile tops 20 are limitless and really only depend on the molding apparatus to accomplish a lavatory top or as in the case of FIG. 12 a kitchen counter or bar counter mounted upon a cabinet 52.

Figure 6B:
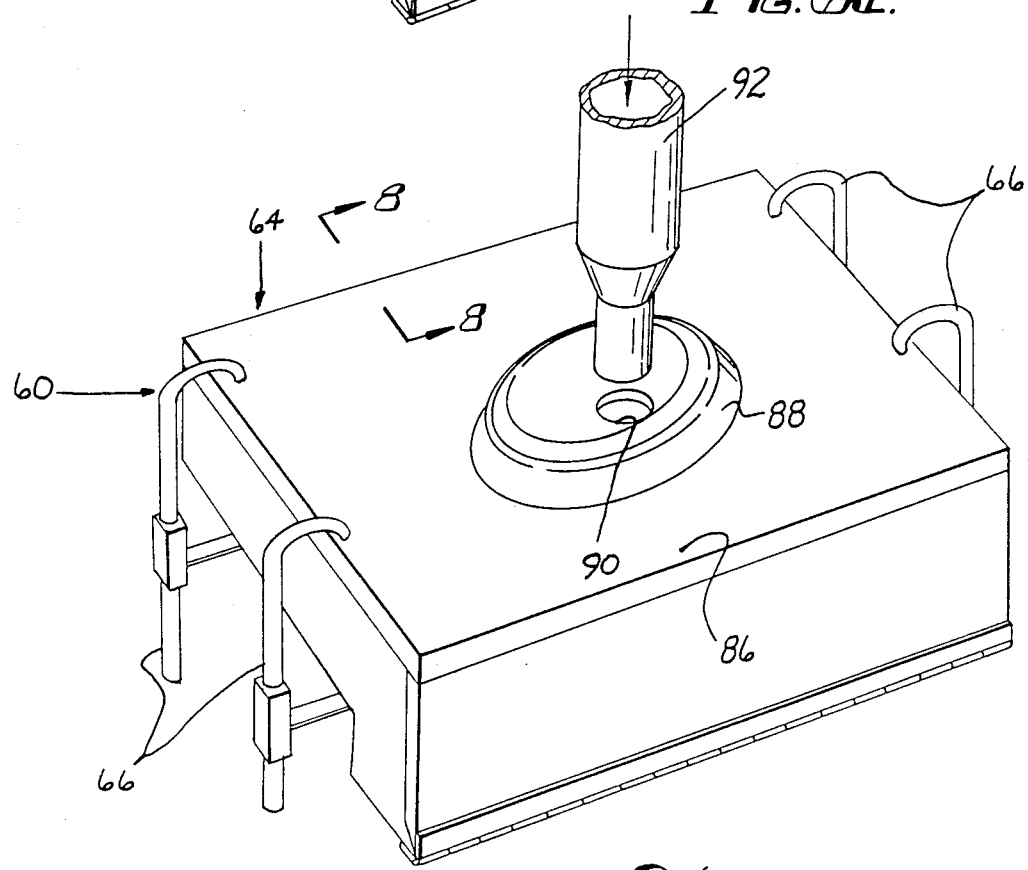

The formation of the simulated tile top 20 is preferably accomplished in a mold generally designated 60, see FIG. 6b. The mold is of the cavity type with a cavity section generally designated 62, see FIG. 6a and a top cover section generally designated 64, see FIG. 6b. When the full mold 60 is assembled clamps 66 may be used to hold the two sections 62 and 64 together so that the top 20 of a particular design may be formed therein.

The key to the formation of the simulated tiles 44 by the grouting paths 38 is the use forming ribs 68 which are positioned on the bottom 70 and in the illustration in FIG. 6a and up the sides 72 of cavity section 62. Section 62 includes a back hinged piece 74 which can be opened for access to the mold and formed the unseen back side of the rear splash section 32.

Each of the ribs 68, see FIGS. 6a, 7, 9, and 10 have parallel sides of 76 and 78, which form the side edges 40 and 42 of the groove 38 and a top surface 80 which may be smooth or roughened to mold the simulated grouting bands 38 as smooth or course as desired. Of course, there are ribs 68 in one direction crossed by other ribs 68 normal thereto. In this way as the matrix is poured the simulated tiles 44 are formed between the simulated normal grouting paths 38.

In the case of the FIG. 6a there is illustrated a sink core 82 with drain opening 84 to form the sink 24.

The top cover section 64 of mold 60 includes a plate 86 which covers the entire cavity between the sides 72 and back 74 and interior complimentary bends and angles. There is in the illustration of FIG. 6b a raised sink cavity portion 88 to overlay the core 82. There is also an opening 90, FIG. 6b to receive a nozzle head 92 through which the liquified material to form the hard matrix may be pumped into the mold 60 to form the top 20.

In order to mold a top or counter 20, the interior bottom, sides and core 82 are preferably first coated with wax. This will assure that the matrix will not stick to the mold.

Next a layer of gelcoat 92, see FIGS. 9 and 10 as previously described is sprayed through sprayer 94 over the entire inner surface of the cavity mold 62. The gelcoat 92 may be clear or colored where the entire simulated tile and grouting surface is desired to be a single color. The gelcoat 92 acts as a top coat for the product to assure a gloss or semi-gloss and also to protect the dried matrix.

After the gelcoat layer 92 is applied the cover section 64 of the mold is applied, see FIG. 6b, the clamps 66 are applied and the desired colored material to form the hard matrix is pumped through nozzle head 92 into the mold 60 filling cavities between the section 62 and 64 of the mold 60.

Figure 6C:
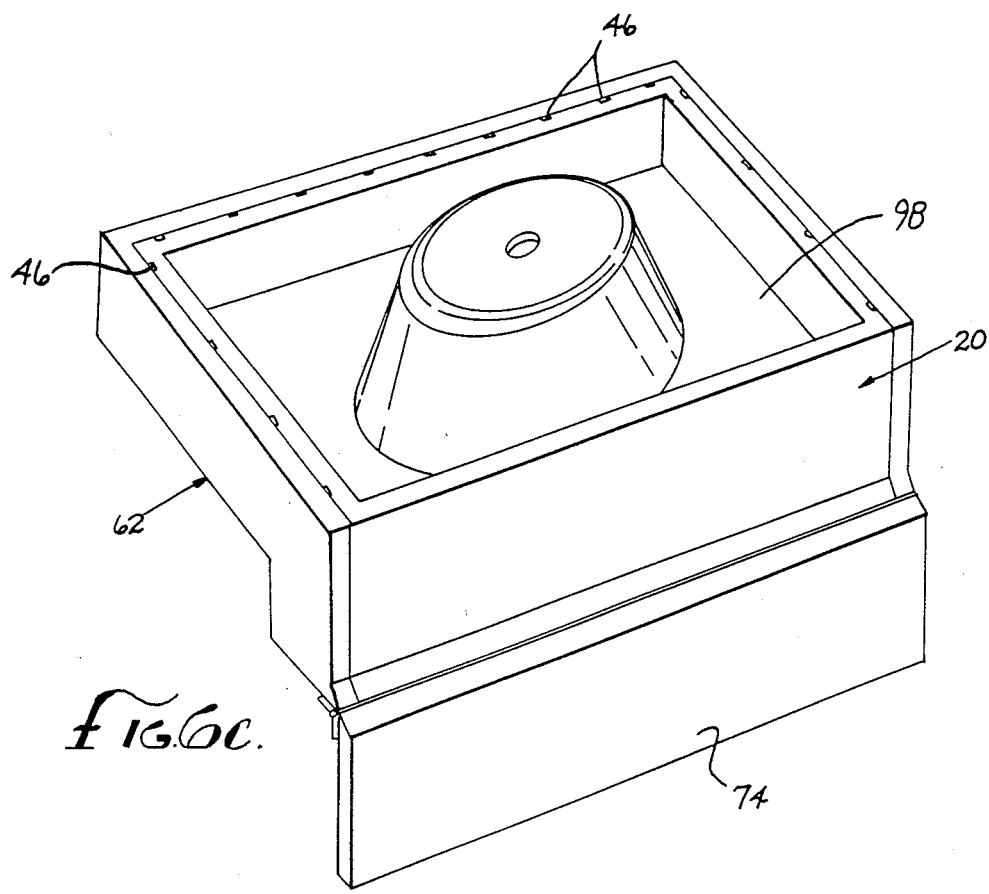

Once the matrix is dry the clamps 66 and cover section 64 are removed and the back hinged piece, see FIG. 6c is opened and the top 20 is ready for removal from cavity section 62. In FIG. 6c the underneath side 98 of the top 20 is shown with the simulated grouting bands 46 visible along the inside edge of top 20.

Figure 7:
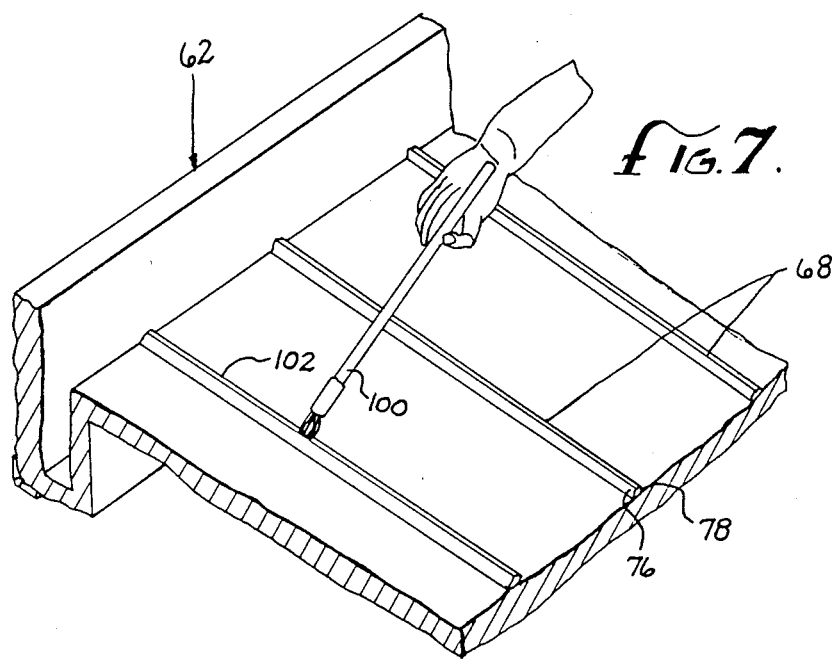
FIG. 7 is a view taken on line 7—7 of FIG. 6a showing grout forming ribs in the mold and the painting technique of coloring the simulated grouting.

In the case of the situation where it is desired that the grouting is to be of a color different than the simulated tiles 44, such as conventional white, after the gelcoat layer 92 is applied a person with a paint brush 100, see FIG. 7, may apply a coat of paint 102, see FIG. 9 on the top surface 80 of the ribs. Then the material for the matrix can be poured. In this way it can be seen that the end product will show the simulated grouting in one color and the simulated tile 44 in another.

In FIG. 10, the grouting path 38 is for real grouting and thus the ribs 68 will be deeper. When a FIG. 10 method is used there is no need to color the bottom surface 48 of the groove any different color as the real grouting 50 is used in a color selected.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A single piece single layer color tinted counter top of material formed to simulate tile and grouting therearound, said tile comprising:

a hardened single sheet single layer color tinted matrix formed with a top surface and peripheral dimension wherein said color is blended throughout said single sheet single layer;

a plurality of first parallel grooves extending in one direction along said top surface of said counter top;

a plurality of second parallel grooves extending normal to and crossing said first parallel grooves;

rectangles created between said crossing parallel grooves adopted to simulate a plurality of tiles and said grooves are adapted to simulate paths of grouting which enclose each of said simulated tile rectangles on said top surface of said single piece counter top.

2. A counter top as defined in claim 1 wherein:
each of said parallel grooves include a roughened bottom surface to further simulate grouting.

3. A single piece counter top as defined in claim 1 wherein said top surface includes a clear resin which imparts a shine to said top.

4. A single piece counter top as defined in claim 1 wherein said top includes:
a splash plate section projecting upwardly along one of said peripheral dimensions and normal to the plane of said top surface, said section including parallel grooves projecting from said grooves in said top surface forming simulated tiles therebetween.

5. A single piece counter top as defined in claim 1 wherein said simulated paths of grouting may be of a different color than said rectangular simulated tiles.

* * * * *